United States Patent
Manneschi

(10) Patent No.: US 11,644,596 B2
(45) Date of Patent: May 9, 2023

(54) COMBINED DETECTOR FOR DETECTING METALS AND MAGNETIZED TARGET OBJECTS

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 0 days.

(21) Appl. No.: 17/260,806

(22) PCT Filed: Jul. 15, 2019

(86) PCT No.: PCT/EP2019/069048
§ 371 (c)(1),
(2) Date: Jan. 15, 2021

(87) PCT Pub. No.: WO2020/016197
PCT Pub. Date: Jan. 23, 2020

(65) Prior Publication Data
US 2021/0293988 A1 Sep. 23, 2021

(30) Foreign Application Priority Data
Jul. 16, 2018 (FR) ...................................... 1856547

(51) Int. Cl.
*G01V 3/10* (2006.01)
(52) U.S. Cl.
CPC ..................................... *G01V 3/10* (2013.01)
(58) Field of Classification Search
None
See application file for complete search history.

(56) References Cited

U.S. PATENT DOCUMENTS

| 4,060,039 A | * 11/1977 | Lagarrigue | ............. G01V 3/10 109/3 |
| 4,866,424 A | * 9/1989 | Parks | ...................... G01T 1/167 340/572.1 |
| 6,133,829 A | 10/2000 | Johnstone et al. | |

(Continued)

FOREIGN PATENT DOCUMENTS

| CN | 202092973 U * 12/2011 | |
| EP | 1750149 A2 * 2/2007 | ............. G01V 3/104 |

(Continued)

OTHER PUBLICATIONS

International Search Report including Written Opinion for PCT/EP2019/069048 dated Oct. 8, 2019. 9 pgs.

(Continued)

Primary Examiner — Patrick Assouad
Assistant Examiner — Haidong Zhang
(74) Attorney, Agent, or Firm — Lerner David LLP

(57) ABSTRACT

The invention concerns a combined detector comprising—an active metal detection system comprising at least two vertical posts together defining a transit channel and distributed in the two vertical posts configured to emit an alternating magnetic field and designed to generate signal representative of a perturbation of the magnetic field induced when an individual passes between the two vertical posts, at least one passive metal detection system comprising at least one static magnetostatic sensor configured to generate a signal indicative of an intensity of a static magnetic field, the passive detection system being housed in one of the vertical posts.

18 Claims, 7 Drawing Sheets

(56) References Cited

U.S. PATENT DOCUMENTS

| | | | |
|---|---|---|---|
| 2004/0000999 A1* | 1/2004 | Turner | G01V 3/10 340/572.4 |
| 2012/0139556 A1 | 6/2012 | Annowsky et al. | |
| 2018/0012465 A1 | 1/2018 | Keene et al. | |
| 2021/0247541 A1 | 8/2021 | Manneschi | |
| 2021/0263177 A1 | 8/2021 | Manneschi | |
| 2021/0263178 A1 | 8/2021 | Manneschi | |

FOREIGN PATENT DOCUMENTS

| | | |
|---|---|---|
| FR | 3083327 A1 | 1/2020 |
| FR | 3083328 A1 | 1/2020 |
| FR | 3083329 A1 | 1/2020 |
| JP | H07244165 A | 9/1995 |
| RU | 17331 U1 | 3/2001 |
| RU | 2582883 C1 | 4/2016 |
| WO | 2016097724 A1 | 6/2016 |

OTHER PUBLICATIONS

Westminster. "WI Code: 11443 Product Data Sheet WG Portable Walk-By Mobile Phone and Metal Detector" Jul. 31, 2017 (Jul. 1, 2017). Retrieved from the Internet:https://www.wi-ltd.com/wp-content/uploads/2016/05/ WG-Portabale-Walk-By-Mobile-Phone-and-Metal-Detector-1.pdf [retrieved on Jul. 6, 2019] XP055594600. 2 pages.

Gui Yun Tian et al. "Design of an electromagnetic imaging system for weapon detection based on GMR sensor arrays" Sensors and Actuators A: Physical, Elsevier BV, NL,vol. 174, Nov. 24, 2011 (Nov. 24, 2011), pp. 75-84.

Anonymous. "News—p. 5 of 9—Westminster International Ltd", Nov. 22, 2016 (Nov. 22, 2016), Retrieved from the Internet: https ://www.wi-ltd.com/news/page/5/ [retrieved on Jun. 6, 2019] XP055594603. 9 pages.

Zaitseva, E.S. "Application of non-magnetic shields for protection against external magnetic interference of weak magnetic field sensors" Ministry of Education and Science of the Russian Federation, Department of General Physics, 2017, pp. 1-14.

* cited by examiner

COMBINED DETECTOR FOR DETECTING METALS AND MAGNETIZED TARGET OBJECTS

CROSS-REFERENCE TO RELATED APPLICATIONS

The present application is a national phase entry under 35 U.S.C. § 371 of International Application No. PCT/EP2019/069048, filed Jul. 15, 2019, which claims priority from French Patent Application No. 1856547 filed Jul. 16, 2018, all of which are incorporated herein by reference.

FIELD OF THE INVENTION

The invention relates to the field of the detection of target objects, and more particularly the detection of unauthorized objects in an access-protected area.

TECHNOLOGICAL BACKGROUND

Recently, different miniaturized phones and smartphones which prove to be undetectable by conventional walk-through metal detectors have been proposed on the market. Indeed, the amount of metal comprised in these devices has been reduced to a minimum thanks to the use of metallized plastics such as radiofrequency shields or to solutions molded in conductive plastic.

The presence of mobile phones in some environments such as prisons is strictly prohibited insofar as they can be used by prisoners to communicate with the exterior and continue their criminal activities and other illegal actions from within the prisons.

Certainly, the walk-through metal detectors are capable of detecting such mobile phones when their sensitivity is high enough, insofar as these phones always comprise metal in smaller or larger amounts. However, such sensitivity is not suitable for all the situations requiring an inspection. Thus, a high sensitivity is suitable in cases where the walk-through metal detectors are placed in high security prisons, in which the prisoners are required to wear specific metal-free clothing. Conversely, in prisons with a lower level of security, the prisoners and/or their visitors are authorized to wear their own clothes which may include metallic objects such as zippers, buttons, etc. A choice must therefore be made between adjusting the sensitivity of the walk-through metal detector to a level high enough to allow it to detect any metallic element, including miniaturized phones, which implies that the walk-through detector generates a large amount of unnecessary alarms whenever the inspected person is wearing metal, or adjusting the sensitivity to a moderate level allowing the walk-through detector to detect large metallic objects, such as weapons, without detecting small metallic objects of everyday life (watches, belts, etc.) and thus avoiding the generation of false alarms. However, when the sensitivity is moderate, the walk-through metal detectors are then no longer capable of detecting small-sized objects such as miniaturized phones.

Alternatively, detection of the mobile phones can also be carried out using individual portable barriers comprising magnetostatic sensors. Such barriers generally comprise a post fixed to a base and equipped with at least one magnetostatic sensor, for example three magnetostatic sensors distributed over the height of the post. Each sensor is configured to generate a signal (voltage) indicative of a change in the intensity of a detected magnetic field. These barriers are in particular used in prisons in order to detect whether prisoners are wearing magnetized or ferromagnetic objects, and more particularly cell phones. For that purpose, the sensitivity of the magnetostatic sensors can be very high, the prisoners being normally deprived of any metallic or magnetic material.

The current practice is to place the walk-through metal detectors at the entrance to critical areas of prisons (including in particular the visitor entrance), at the prisoner receiving areas, at the transit areas between the workshops and the cells, etc. whereas the barriers are portable and are therefore placed temporarily in other areas in order to inspect the prisoners without them being able to predict it in advance. However, in practice, it turns out that the prisoners adapt their behavior according to the areas they are crossing. Particularly, the prisoners know that they can move around with a stainless steel knife in the corridors without risking to sound an alarm when passing next to a barrier (the stainless steel not being ferromagnetic) and that they can get a miniature phone during a visit since the sensitivity of the walk-through metal detectors must be moderate to avoid false alarms.

Document EP 1 750 149 describes an example of a walk-through metal detector comprising coils distributed in the vertical supports of the walk-through detector configured to emit an alternating magnetic field and adapted to generate a signal representative of a disturbance in the magnetic field induced upon passage of an individual between the two vertical supports. However, this walk-through detector example does not allow detecting both small target objects of the miniaturized mobile phone type and large metallic objects such as weapons.

Document "WI CODE: 11443 PRODUCT DATA SHEET WG Portable Walk-By mobile", Westminster International Ltd, describes a detector comprising a detection system. The operation of the detector is however not detailed.

The article "Design of an electromagnetic imaging system for weapon detection based on GMR sensor arrays", SENSORS AND ACTUATORS A: PHYSICAL, ELSEVIER BV, NL, of GUI UEN TIAN et al, describes a detector comprising a conventional active metal detection system and an additional system comprising GMR (Giant Magneto-Resistive) sensors. The GMR sensors measure the distortion of the alternating magnetic field generated by the passage of a metallic object in the detector to obtain an image of the object. Here again, the detector in this document does not allow detecting both small and large target objects.

SUMMARY OF THE INVENTION

An objective of the invention is therefore to propose new detection means capable of improving the detection of target objects likely to be worn by an individual, whether they are small target objects such as miniaturized mobile phones or large metallic objects such as weapons, regardless of the environment in which the detection is made.

For that purpose, the invention proposes a combined detector comprising:
 an active metal detection system comprising:
  at least two vertical supports defining therebetween a transit channel and
  coils distributed in the two vertical supports configured to emit an alternating magnetic field and adapted to generate a signal representative of a disturbance in the magnetic field induced upon passage of an individual between the two vertical supports,
 at least one passive metal detection system comprising at least one magnetostatic sensor configured to generate a signal indicative of an intensity of a static magnetic field, the passive detection system being housed in one of the vertical supports.

Some preferred but non-limiting characteristics of the combined detector described above are as follows, taken individually or in combination:

the combined detector further comprises at least one conductive shield associated with the at least one magnetostatic sensor and configured to short-circuit surface currents.

each magnetostatic sensor is surrounded by a conductive shield.

the conductive shield comprises a cylindrical sleeve made of a non-magnetic metallic material such as aluminum, copper and/or brass.

each magnetostatic sensor has a determined height, and a height of the conductive shield is greater than the determined height of the associated magnetostatic sensor, preferably a height at least equal to 1.5 times the determined height of the associated magnetostatic sensor.

the at least one magnetostatic sensor is centered in height relative to the associated conductive shield.

the passive detection system comprises: at least two magnetostatic sensors distributed over a height of the passive detection system, each magnetostatic sensor being surrounded by a conductive shield, and a separation sleeve made of an electrically insulating material, said separation sleeve being placed between the two conductive shields so as to separate said conductive shields.

the conductive shield is connected to a fixed potential, for example to ground.

the combined detector comprises at least two magnetostatic sensors per passive detection system, the at least two magnetostatic sensors of each passive detection system being connected to the fixed potential in a star configuration.

the combined detector further comprises a central processing unit and processing unit, said central processing unit being connected on the one hand to the coils and on the other hand to the at least one magnetostatic sensor and being configured to receive and process both the signal representative of a disturbance in the alternating magnetic field and the signal indicative of an intensity of a static magnetic field.

the central processing unit is further configured to correlate in time and/or space the signal representative of a disturbance in the alternating magnetic field and the signal indicative of an intensity of a static magnetic field.

the combined detector further comprises a transmitter, the central processing unit being configured to send alarm generation instructions to the transmitter when the signal representative of a disturbance in the alternating magnetic field is greater than a first predetermined threshold value and/or when the signal indicative of an intensity of a static magnetic field is greater than a second predetermined threshold value.

the combined detector comprises at least two passive detection systems each comprising at least one magnetostatic sensor, the magnetostatic sensors of each passive detection system being positioned two by two at the same height relative to the floor so as to form pairs of opposite sensors, each passive detection system being housed in an associated vertical support and being connected to the central processing unit, said central processing unit being configured to calculate a value from the signals generated by the magnetostatic sensors of the two passive detection systems, said calculated value comprising one of the following values: an average value for each pair of magnetostatic sensors of the signals generated by the magnetostatic sensors; an average, a sum or a maximum value of the corrected values of the signals generated by the magnetostatic sensors by applying to each pair of sensors an attenuation coefficient to said signals; a sum of the values of the signals generated by each pair of magnetostatic sensors; a maximum value among the values of the signals generated by each pair of magnetostatic sensors.

BRIEF DESCRIPTION OF THE DRAWINGS

Other characteristics, aims and advantages of the present invention will become more apparent upon reading the following detailed description, and with regard to the appended drawings given by way of non-limiting examples and in which.

DETAILED DESCRIPTION OF ONE EMBODIMENT

Figure 1:
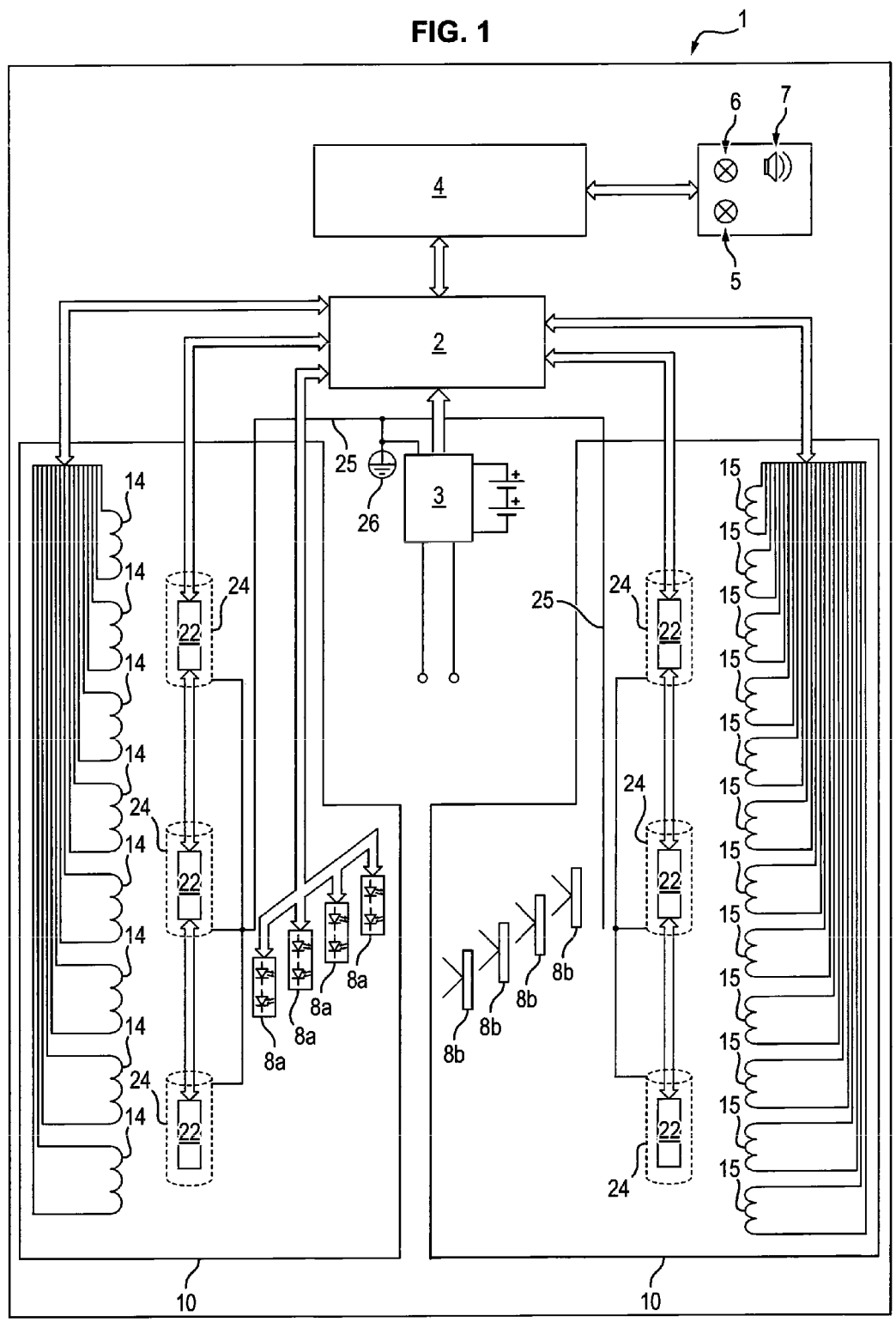
FIG. 1 is a synopsis illustration of a combined detector according to one embodiment of the invention.

A combined detector 1 according to the invention comprises:

an active metal detection system 10, or walk-through detector 10, comprising at least two vertical supports 12 and coils 14, 15 distributed in the two vertical supports 12, and at least one passive detection system 20, or barrier 20, housed in one of the vertical supports 12 and comprising at least one magnetostatic sensor 22.

The Applicant has indeed noticed that phones with a small amount of metal (such as miniaturized phones) and therefore difficult to detect by the active detection systems intended to detect them, had a significant magnetic intensity (moment), while phones with a large amount of metal (such as current smartphones sold by major mobile phone brands) had a low magnetic moment. The use of such a combined detector 1 therefore allows detecting both the miniaturized phones (thanks to the passive detection system 20) and the current smartphones (thanks to the active detection system 10) in a simple and a space-saving manner.

More specifically, the walk-through detector 10 comprises, in a manner known per se, a U-shaped structure comprising two vertical supports 12 connected at their upper part by a horizontal beam 16. Where appropriate, the horizontal beam 16 can be equipped with any visualization device and/or any conventional control element.

The vertical supports 12 thus delimit a passage or transit channel in the middle of which a person to be inspected must pass.

In one variant not illustrated in the figures, the walk-through detector 10 does not include a horizontal beam 16 so that the vertical supports 12 are separated from each other.

Each vertical support 12 houses one or more coils 14, 15 connected to a central processing unit and processing unit 2, which can be housed in the horizontal beam 16, in one of the vertical supports 12 or be placed at a distance from said vertical supports 12. Some of the coils 14, 15 form alternating magnetic field transmitters and some of the coils 14, 15 form receivers. The same coils 14, 15 can moreover alternately form a transmitter coil 14 and a receiver coil 15.

Several variants of such coils 14, 15 and of an associated central processing unit 2 are well known to those skilled in the art and will not be described in detail hereinafter.

FIG. 1 schematically illustrates, for example, a set of transmitter coils 14 (here, eight transmitter coils 14) and a set of receiver coils 15 (here, twelve receiver coils 15) forming several channels.

The central processing unit 2 has the function of analyzing the signal taken from each receiver coil 15 in order to detect the presence of metal influencing the alternating and/or electric magnetic field generated by the transmitter coils 14 and therefore the coupling between transmitter coil(s) 14 and receiver coil(s) 15. Where appropriate, depending on the configuration of the coils 14, 15 and the nature of the processing carried out by the central processing unit 2, said central processing unit 2 can also be configured to determine the geometry of the detected objects, their density, their mass, etc. The configuration of the coils 14, 15 and the nature of the signals as well as the processing carried out by the central processing unit 2 therefore allow carrying out a detailed analysis of the objects worn by the individuals to be checked who pass through the walk-through detector 10.

Figure 2:
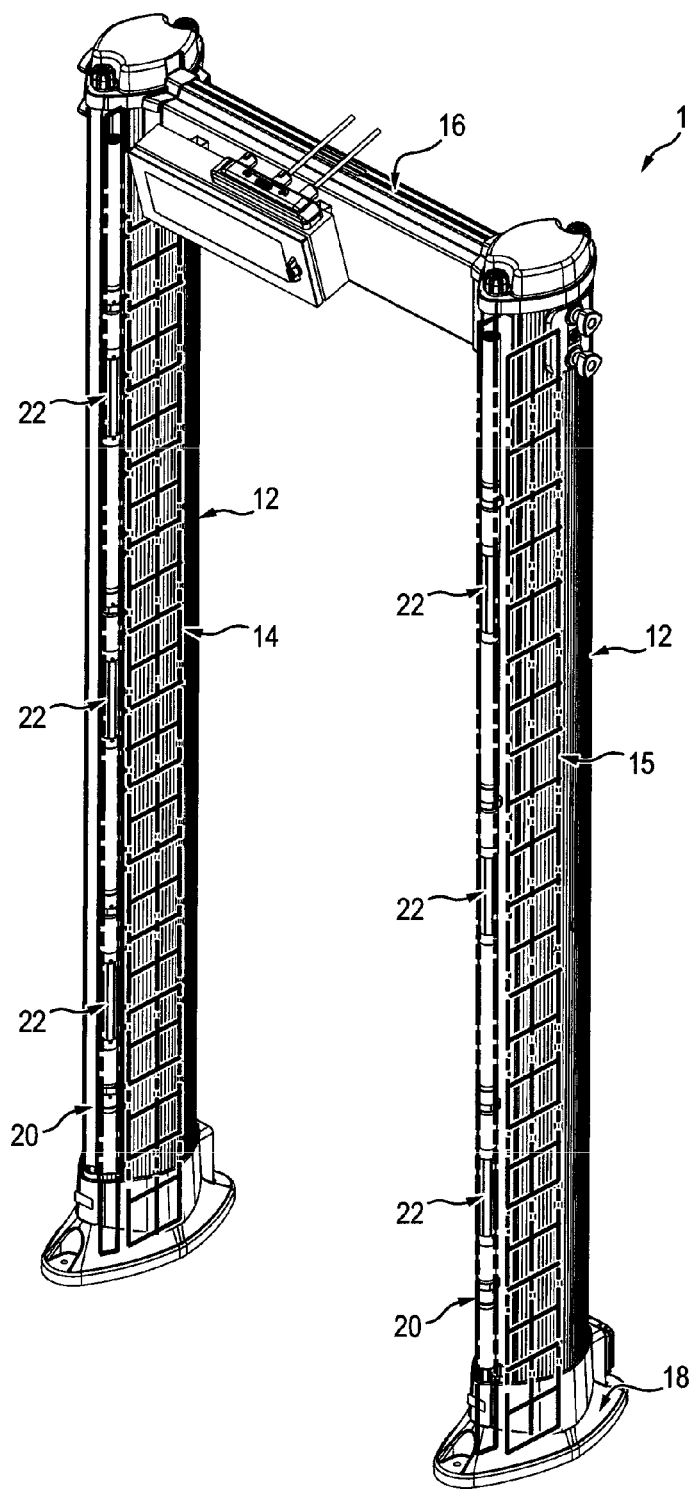
FIG. 2 is a perspective view of an example of a combined column detector according to one embodiment of the invention, which shows in transparency and represents in a schematic manner the transmitter and receiver coils of an active detection system with alternating magnetic field and two passive detection systems housed in a respective panel of the combined detector.
Figure 3:
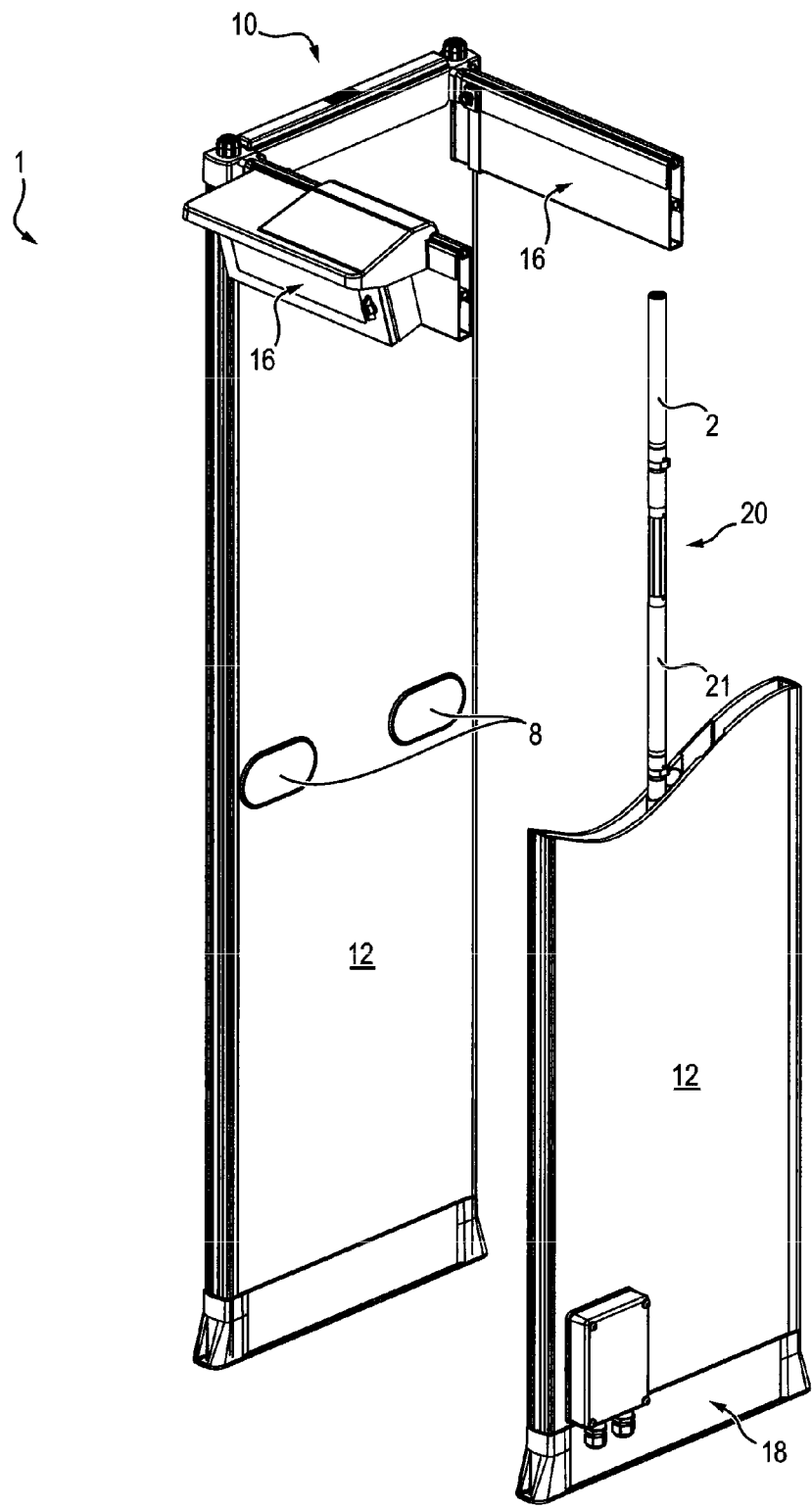
FIG. 3 is a perspective view of an example of a combined panel detector according to one embodiment of the invention, an upper part of one of the columns having been omitted in order to partially show the upper portion of the passive detection system.

In a first embodiment illustrated in FIG. 3, the vertical supports 12 comprise panels and for that purpose have a general planar shape, that is to say a small thickness transversely to the direction of passage and a significant width parallel to this direction. As a variant, in a second embodiment illustrated in FIG. 2, the vertical supports 12 comprise columns and have for that purpose a shape that is substantially circular in revolution or elliptical.

The vertical supports 12 have sufficient height to allow the passage of persons to be inspected. For that purpose, each vertical support 12 has a height at least equal to 2.10 m.

Each barrier 20 comprises one or more magnetostatic sensors 22.

More specifically, each barrier 20 comprises at least one magnetostatic sensor 22, preferably at least two, for example three magnetostatic sensors 22 distributed over a height of the vertical support 12 in which it is housed. By height, it will be understood here the dimension along a direction normal to the floor between a base 18 of the walk-through detector 10 and the horizontal beam 16.

For example, the barrier 20 may comprise a first magnetostatic sensor 22 in the vicinity of the floor in order to detect target objects worn at the feet of an inspected person, a second magnetostatic sensor 22 at mid-height (for example between approximately 1.00 m and 1.20 m off the floor) in order to detect target objects worn at the hips and a third magnetostatic sensor 22 at shoulder height (for example approximately 1.70 m off the floor).

The sensors 22 of the barrier 20 can be fixed either on a post 21 which is added and fixed into the associated vertical support 12 of the walk-through detector 10, or directly on a one-piece structure belonging to the walk-through detector 10, which can for example be obtained by molding with the associated vertical support 12.

The structure (post 21 or one-piece structure) carrying the sensors of the barrier 20 has a height less than or equal to the height of the vertical supports 12 in order to be hidden in said supports 12. For example, the height of the structure can be comprised between 1.70 m and 2.00 m.

Each magnetostatic sensor 22 is configured to detect a static magnetic field generated by a magnetized element or resulting from a change in the earth's magnetic field upon passage of a ferromagnetic element in the transit channel. For that purpose, each magnetostatic sensor 22 comprises a magnetic-field sensitive element (such as a Hall cell, a magnetoresistance or a fluxgate, etc.) fixed on an electronic board 23 so as to generate a signal indicative of an intensity of the detected static magnetic field. In one embodiment, the signal generated by the magnetostatic sensor 22 is a voltage whose value is proportional to the intensity of the static magnetic field detected.

In order to improve the barrier 20 detection efficiency, all or part of the magnetostatic sensors 22 are configured to detect an intensity of a static magnetic field along three orthogonal axes.

The magnetostatic sensors 22 of the barrier 20 are connected either in a daisy chain or directly on separate lines to the central processing unit 2. The central processing unit 2 is therefore configured to receive both the signals indicative of a disturbance in the alternating magnetic field coming from the coils 14, 15 from the walk-through detector 10 and the signals indicative of a static magnetic field detected by the magnetostatic sensors 22 from the barrier 20.

The sharing of the central processing unit 2 for the walk-through detector 10 and the barrier 20 thus allows reducing the space requirement of the combined detector 1.

The central processing unit 2 can for example be housed in the horizontal beam 16.

As a variant, as indicated above, the central processing unit 2 can be remote and connected via a communication interface to the magnetostatic sensors 22 of the barrier 20 and to the coils 14, 15 of the walk-through detector 10. The communication interface preferably comprises a wired interface, the combined detector 1 being generally permanently fixed. Alternatively, the communication interface can comprise a wireless interface in the case where the combined detector 1 must be movable in order to facilitate its installation, for example an interface of the Wi-Fi or Bluetooth type or via optical, radio, infrared or inductive communication, etc.

Preferably, in order to improve the detection of ferromagnetic objects and/or comprising magnetized elements, the combined detector 1 comprises at least two barriers 20, each barrier 20 being housed in an associated vertical support 12 of the walk-through detector 10.

In this case, the magnetostatic sensors 22 of each barrier 20 are positioned two by two at the same height relative to the floor so as to form pairs of opposite sensors.

As seen below, the central processing unit 2 is then configured to calculate a value from the signals generated by the magnetostatic sensors 22 of the two passive detection systems. This calculated value can then comprise one of the following values: an average value for each pair of sensors of the signals generated by the sensors; an average, a sum or a maximum value of the corrected values of the signals generated by the sensors by applying to each pair of sensors an attenuation coefficient to said signals; a sum of the values of the signals generated by each pair of sensors; a maximum value among the values of the signals generated by each pair of sensors.

The combination, within the same detector, of coils 14, 15 and of magnetostatic sensors 22 creates significant parasitic signals and major coupling problems due to both:

the generation of an alternating magnetic field by the transmitter coils 14 of the walk-through detector 10 which disturbs the magnetostatic sensors 22 of the barrier(s) 20 and the voltage generated by the magnetostatic sensors 22 of the barrier(s) 20 which disturbs the receiver coils 15 of the walk-through detector 10.

Accordingly, in order to allow a reliable detection and to avoid disturbances due to interference signals and to capacitive coupling, each magnetostatic sensor 22 of the combined detector 1 is at least partially surrounded by a conductive shield 24. For example, the shield 24 can be made of a non-magnetic metallic material (i.e. a metallic material which does not acquire transient or permanent magnetic properties when placed in a magnetic field or subjected to a magnetization process), typically one of the materials from the following list: aluminum, copper and/or brass.

In this way, the shield 24 short-circuits the alternating magnetic field generated by the transmitter coils 14 by inducing currents at its external surface which prevent penetration of said magnetic field and prevent any disturbance in the magnetostatic sensors 22.

In one embodiment, each shield 24 is further connected to a fixed potential source, for example to ground, in order to form a capacitive barrier and avoid capacitive couplings between the magnetostatic sensor 22 it surrounds and the receiver coils 15. For that purpose, a conductive wire 25 can for example be connected to a metal rod or a screw fixed on the shield 24 and on the fixed potential source 26, typically the floor.

In the case where the combined detector 1 comprises several magnetostatic sensors 22, and therefore several shields 24, each shield 24 is connected to the fixed potential 25 (for example to ground), for example according to a star configuration (see FIG. 1) or separately according to separate lines.

Preferably, the shape and dimensions of the conductive shield 24 are chosen so that a maximum of the surface of the magnetostatic sensor 22 it surrounds is covered by the shield 24 in order to minimize the risks of coupling and spurious signals. For example, only the upper (horizontal beam side 16) and lower (floor side) ends can remain open.

For example, the conductive shield 24 may comprise a hollow sleeve having a substantially cylindrical shape inside which the magnetostatic sensor 22 is housed. The dimension and shape of the sleeve 24 are chosen so that the sleeve 24 is adjusted around the magnetostatic sensor 22 and thus so as to increase its efficiency. For example, the sleeve 24 can have a cylindrical shape, typically a revolution shape, a square section, a polygonal section, etc. Where appropriate, a blind window can be formed in the inner face of the sleeve 24, facing the sensor, in order to avoid any contact between the magnetostatic sensor 22 and the sleeve 24. Optionally, an insulating layer can also be applied at the window, between the magnetostatic sensor 22 and the bottom of the window.

In one embodiment, the height H of each sleeve 24 is at least equal to the height h of the magnetostatic sensor 22 it surrounds in order to cover its entire surface. Where appropriate, the magnetostatic sensor 22 may be centered (in height) relative to the sleeve 24. By way of example, the height H of each sleeve 24 can be greater than or equal to 1.5 times the height h of the magnetostatic sensor 22 it covers in order to reduce the risks of coupling. In this exemplary embodiment, the sleeve 24 can then remain open at its upper and lower ends.

When the barrier 20 comprises several magnetostatic sensors 22 distributed over its height, separation sleeves 26, made of an insulating material such as a non-conductive plastic, can be placed between the shields 24 so as to separate them. Similarly to the sleeves forming the shield 24, the separation sleeves 26 may have a cylindrical shape.

The separation sleeves 26 can form an integral part of the structure carrying the sensors, whether it is a post 21 or a one-piece structure with the walk-through detector 10.

For example, in the case of a barrier 20 comprising a post 21 and at least two magnetostatic sensors 22, each magnetostatic sensor 22 can be fixed at its upper and lower edges on separation sleeves 26. For that purpose, a slot 27 can be formed in one end of the separation sleeves 26 in order to receive one of the edges of the electronic board 23 of the magnetostatic sensor 22 (see for example FIG. 4) and to maintain it in a fixed position in the post 21. The shield 24 is then added and fixed onto these separation sleeves 26 so as to wrap the magnetostatic sensor 22 and cover it over its entire height. Preferably, the shield 24 overlaps the separation sleeves 26 since its height H is greater than that of the magnetostatic sensor 22. Typically, the shield 24 may overlap each separation sleeve 26 by a distance equal to about 25% of the height of the shield.

Where appropriate, each separation sleeve 26 may be locally thinned so as to form a shoulder 28 configured to receive with adjustment the shield 24.

Figure 4:
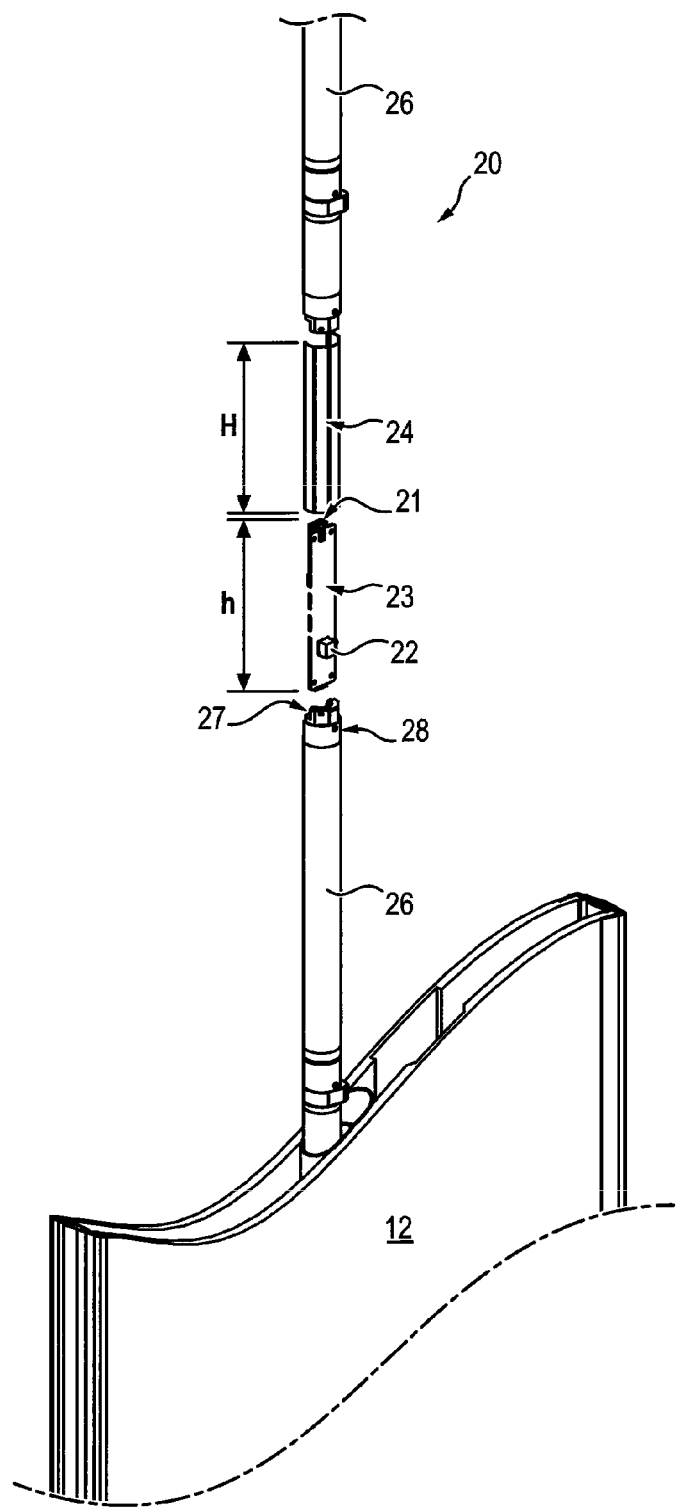
FIG. 4 is a detailed and exploded view of the upper portion of the passive detection system of FIG. 3.

Typically, in the exemplary embodiment illustrated in FIG. 4, the barrier 20 comprises a magnetostatic sensor 22 in the upper part surrounded by a shield 24 comprising a sleeve of polygonal cross-section formed of several metal plates assembled along their longitudinal edge. The shield 24 is fixed in the upper part and in the lower part on a separation sleeve 26. Each separation sleeve 26 comprises, at one end, a slot 27 for fixing the electronic board 23 of the magnetostatic sensor 22. The section of this end is also polygonal so as to come in contact with adjustment with the inner face of the sleeve.

As a variant, the separation sleeves 26 can be added and fixed onto the structure carrying the magnetostatic sensors 22.

The combined detector 1 also comprises, in a manner known per se, a power supply module 3 and a Human Machine Interface 4 (HMI), which are both connected to the central processing unit and processing unit 2, as well as one or more transmitters 5, 6, 7 connected to the human machine interface HMI or to the central processing unit 2.

Each transmitter 5, 6, 7 is configured to generate an alarm signal, for example an acoustic signal and/or an optical signal (LED, flashing light, etc.). The transmitter 5, 6, 7 can be comprised in the combined detector 1 or alternatively be worn by an operator (headset, etc.), in which case the central processing unit 2 sends the alarm generation instructions to the remote transmitter 5, 6, 7 via a wireless communication interface (such as the communication interface described above).

Where appropriate, the combined detector 1 can comprise at least one transmitter 7 associated with the walk-through detector 10 and at least one transmitter 5, 6 associated with the barrier 20 in order to allow an operator to easily determine the origin of the alarm.

Optionally, the combined detector 1 can further comprise one or more pairs of photoelectric cells 8a and as many reflectors 8b fixed two by two on the vertical supports 12 of the walk-through detector 10 so as to extend facing each other, between its entrance and its exit, in order to detect the entrance and to follow the passage of a person to be inspected in the transit channel. It is thus possible to determine whether the detection of the person to be inspected has indeed taken place while the latter was within the walk-through detector 10, between the two vertical supports 12, and where appropriate whether this person was at its entrance, in the central part or at its exit.

For that purpose, the photoelectric cells 8a are connected to the central processing unit 2 and, upon detection, send thereto position information on the person to be inspected. Where appropriate, the central processing unit 2 can correlate in time and/or space this position information on the person inspected with the signals generated by the magnetostatic sensors 22 and by the coils 14, 15.

An example of operation of a combined detector 1 can then comprise the following steps.

During a first step, an operator adjusts the sensitivity of the combined detector 1 to a level adapted according to the area in which said combined detector 1 is located, using the human machine interface HMI.

Preferably, the operator enters only one level of sensitivity for the two (active and passive) detection systems. This level of sensitivity is then applied to the walk-through detector 10 and to the barrier 20, according to a predefined distribution.

As a variant, the operator can adjust the level of sensitivity of the walk-through detector 10 and of the barrier 20 separately.

During a second step, a person to be inspected passes through the transit channel delimited by the vertical supports 12 of the walk-through detector 10.

If the person to be inspected wears a metallic element, such as a weapon or a large-sized smartphone, its passage through the transit channel has the effect of disturbing the alternating magnetic field generated by the transmitter coils 14. The receiver coils 15 therefore send a signal representative of this disturbance in the magnetic field induced by the passage of the person to the central processing unit 2.

If the value of this signal is smaller than a first predetermined value (which depends on the level of sensitivity entered by the operator), the central processing unit 2 does not send alarm generation instructions to the transmitters 5, 6, 7.

On the contrary, if the value of this signal is greater than or equal to the predetermined value, the central processing unit 2 sends alarm generation instructions to the at least one of the transmitters 5, 6, 7.

In one embodiment, the transmitter 7 receiving the alarm generation instructions is a transmitter 7 associated with the walk-through detector 10 to allow the operator to determine that it is the barrier 20 that has detected the target object and to deduce therefrom the type of target object to look for.

If the person to be inspected is wearing a magnetized element, such as a miniaturized phone, the magnetostatic sensor(s) 22 detect the static magnetic field generated by this magnetized element. The magnetostatic sensors 22 therefore send a signal indicative of said magnetic field to the central processing unit 2.

Where appropriate, the central processing unit 2 calculates a value from the signals generated by the magnetostatic sensors 22 of the two passive detection systems.

If the calculated value is smaller than a second predetermined value (which depends on the sensitivity level entered by the operator), the central processing unit 2 does not send alarm generation instructions to the transmitters.

On the contrary, if the calculated value is greater than or equal to the second predetermined value, the central processing unit 2 sends alarm generation instructions to at least one of the transmitters 5, 6, 7.

In one embodiment, the transmitter(s) 5, 6 receiving the alarm generation instructions are transmitters 5, 6 associated with the barrier 20 to allow the operator to determine that it is the barrier 20 that has detected the target object and deduce therefrom the type of target object to look for.

If the person to be inspected is wearing both a metallic element and a magnetized element, its passage has both the effect of disturbing the alternating magnetic field generated by the transmitter coils 14 and generating a signal indicative of a high magnetic field intensity by the magnetostatic sensors 22. The receiver coils 15 therefore send a signal representative of the disturbance in the alternating magnetic field induced by the passage of the person to the central processing unit 2 while the magnetostatic sensors 22 send thereto the signal indicative of the intensity of the static magnetic field generated by the magnetized element at the central processing unit 2.

If the value of the signal from the coils 14, 15 is smaller than the first predetermined value and the value of the signal generated by the magnetostatic sensors 22 (or its calculated value) is smaller than the second predetermined value, the central processing unit 2 does not send alarm generation instructions to the transmitters 5, 6, 7.

On the other hand, if the signal from the coils 14, 15 is greater than or equal to the first predetermined value and/or if the value of the signal generated by the magnetostatic sensors 22 (or its calculated value) is greater than or equal to the second predetermined value, the central processing unit 2 sends alarm generation instructions to the corresponding transmitters 5, 6 or 7.

In one embodiment, in order to improve detection of target objects by the passive detection system 20, and in particular its ability to discriminate small target objects from large-sized ferromagnetic objects, said system comprises two barriers 20 each including at least two facing sensors, each barrier 20 being in a respective vertical support 12. In addition, the central processing unit 2 calculates a value from the signals generated by each pair of sensors. It is then this calculated value that is then compared by the central processing unit 2 with the second detection threshold.

Reference may be in particular made to any one of French patent applications No. FR 18 55900 (publication No. FR3083328), No. FR 18 55903 (publication No. FR3083327) and No. FR 18 55907 (publication No. FR3083329), filed on Jun. 28, 2018 in the name of the Applicant, for examples of calculation of the value from the signals generated by the pairs of sensors.

Particularly, in a first embodiment, the central processing unit 2 calculates an average value of the signals generated by each pair of magnetostatic sensors 22. Of course, when the barriers 20 each comprise only one magnetostatic sensor 22, the central processing unit 2 calculates only one average value corresponding to the average value of the signals from these two magnetostatic sensors 22. The average value can be an arithmetic average value of the signals, which corresponds to the sum of the values of the signals divided by the number of signals or, alternatively, a geometric average value of the signals, which corresponds to the square root of the product of the signals.

In a second embodiment, instead of calculating an average value of the signals of each pair of magnetostatic sensors 22, the central processing unit 2 can correct the signals generated by each of the pairs of magnetostatic sensors 22 by applying an attenuation coefficient to their signals. This correction step thus allows attenuating the signals generated by the magnetostatic sensors 22 of the barriers 20 by applying a correction coefficient to the signals which depends on the value of these signals. More specifically, the objective of the correction is to attenuate the signal when the target object is closer to one of the barriers 20, where the sensitivity is higher, in order to reduce its weight in the detection.

For that purpose, for each pair of magnetostatic sensors 22, the central processing unit 2 determines the maximum value and the minimum value among the signals generated by the first magnetostatic sensor 22 and the second magnetostatic sensor 22 at a given time. The central processing unit 2 then calculates a ratio between the thus determined maximum value and the minimum value and compares it with determined thresholds in order to then deduce therefrom the value of the attenuation coefficient to be applied to the value of the signals.

For example, the central processing unit 2 can in particular compare the ratio with a first threshold and a second threshold, the second threshold being greater than the first threshold, and deduce therefrom the attenuation coefficient. Thus, the attenuation coefficient can be equal to:
  a first value when the ratio is lower than the first threshold,
  a second value smaller than the first value when the ratio is greater than the second threshold and
  a value comprised between the first value and the second value when the ratio is comprised between the first threshold and the second threshold. Particularly, the attenuation coefficient can be a linear function depending on the ratio when said ratio is comprised between the first threshold and the second threshold.

Using the ratio between the maximum value and the minimum value allows determining whether the target object that generates a static magnetic field or disturbs the earth's electromagnetic field is placed next to one of the barriers 20. In this case, the value of the ratio is greater than the second threshold and the attenuation coefficient that is applied is equal to the second value, which is smaller than the first value. On the contrary, when the target object is centered between the two passive detection systems 20, the sensitivity of the horizontal beam 20 in this area is lower. This results in a ratio between the maximum value and the minimum value which is also lower. The attenuation coefficient can therefore be higher and the resulting lower attenuation. A relative virtual uniformity is thus obtained between the two barriers 20. By way of non-limiting example, the first threshold can be equal to 30, the second threshold can be equal to 60, the first value can be equal to 1, the second value can be equal to 0.1 and the attenuation coefficient can be defined by the following function when the ratio is comprised between the first threshold and the second threshold:

$$0.03*R+1.9$$

where R is the value of the ratio.

In other words, the attenuation coefficient can be equal to 1 when the ratio is less than 30, 0.1 when the ratio is greater than 60, and $0.03*R+1.9$ when the ratio is comprised between 30 and 60.

Once the value of the signals is corrected, the central processing unit 2 calculates, from the corrected value of the signals, an average of said corrected values for each pair of magnetostatic sensors 22. It is then the value of this corrected sum that is compared with the second predetermined threshold value.

Alternatively, instead of calculating the average value of the corrected signals, the central processing unit 2 can calculate the sum of the corrected values of the signals or their maximum value, and compare this value (sum or maximum) with the second predetermined threshold value.

Of course, it will be understood that, in the second embodiment, the central processing unit 2 can first calculate the average value (respectively, the sum or the maximum value) of the signals and then apply to this average value (respectively to this sum or to this maximum value) the correction step.

Where appropriate, the central processing unit 2 can further correlate in time and/or space the signal representative of a disturbance in the alternating magnetic field and the signal indicative of an intensity of a static magnetic field.

Indeed, when the walk-through detector 10 comprises several transmitter 14 and receiver 15 coils forming several channels and when the barrier 20 comprises several magnetostatic sensors 22, each channel of coils 14, 15 and each magnetostatic sensor 22 or pair of magnetostatic sensors 22 has a peak of sensitivity when the target object detected is located in an associated and predefined area of space. From the signals generated by the various coils 14, 15 and magnetostatic sensors 22, the central processing unit 2 can therefore determine the area of space in which the target object which has been detected by the magnetostatic sensors 22 and/or the coils 14, 15 is approximately located. The spatial correlation of the signals thus allows the central processing unit 2 to determine whether the signals sent by the coils 14, 15 and the signals generated by the magnetostatic sensors 22 are related to a target object spatially located in the same area of the walk-through detector 10 or whether they are related to separate target objects located in separate areas of the walk-through detector 10.

This spatial correlation of the signals can also be taken into account in sending the alarm generation instructions. For example, the combined detector 1 can comprise several optical transmitters 5, 6 on each vertical support 12 distributed between their upper part and their lower part. By determining the area of space in which the target object has been detected, this area being possibly confirmed by spatial correlation, the central processing unit 2 can send alarm generation instructions only to the transmitters located in the vicinity of this area, for example the transmitters located in the vicinity of the floor of one of the vertical supports 12.

Likewise, the central processing unit 2 can correlate over time the signals received from the magnetostatic sensors 22 and the coils 14, 15 in order to determine whether the detections are substantially simultaneous, in which case the same target object may have been detected, or successive, in which case the walk-through detector 10 and the barriers 20 have probably detected separate objects.

Figure 8:
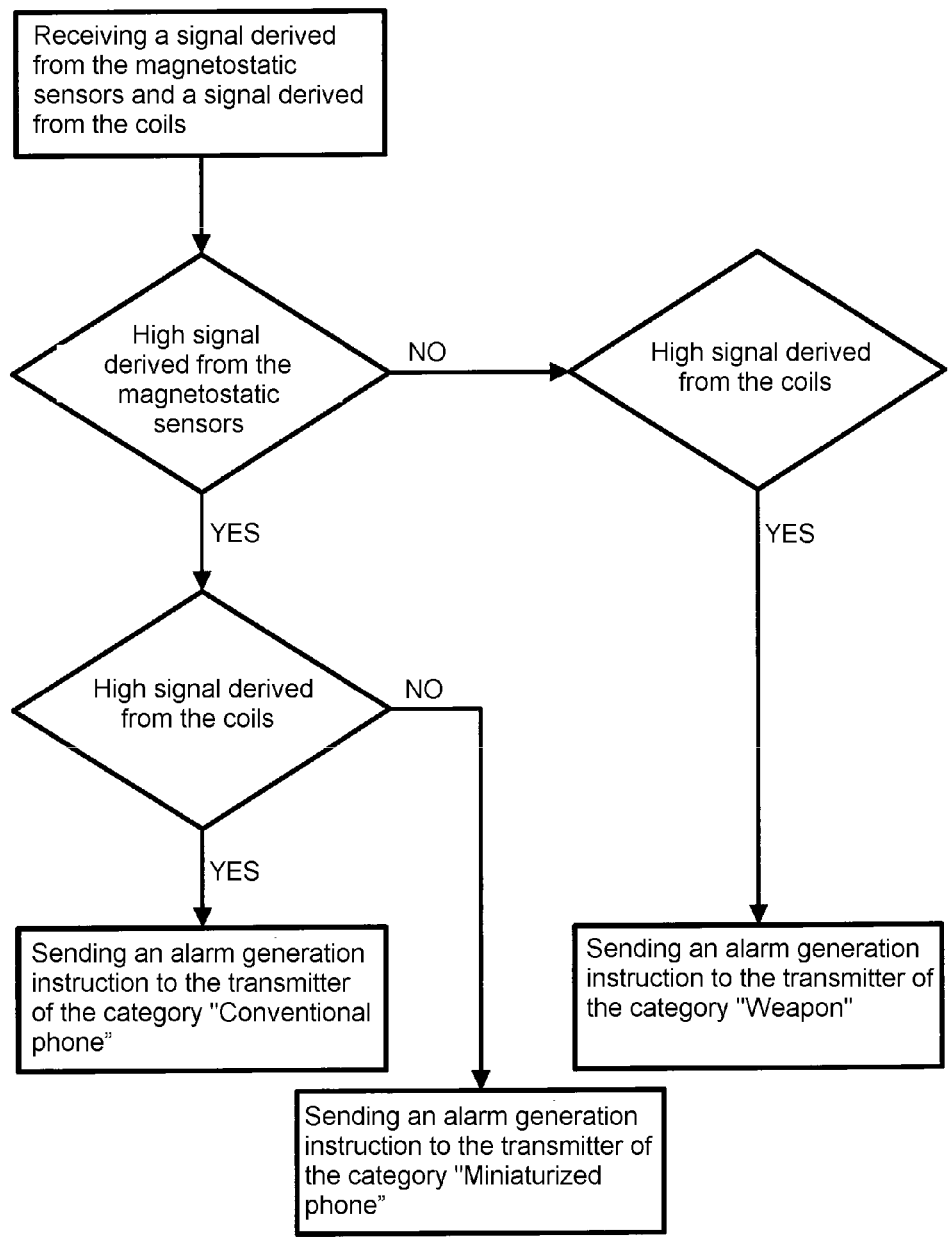
FIG. 8 is a flowchart illustrating an example of deduction steps by the central processing unit of a combined detector of the category of an object detected as a function of the magnetic moment of the received signals.

For example, as illustrated in FIG. 8, when, in the same spatial area of the walk-through detector and in the same time interval, the central processing unit 2 can determine, from the intensity of the signals sent thereto and from their spatial and temporal correlation, if the detected object belongs to one of the following categories: a miniaturized phone, a weapon or a conventional phone. Where appropriate, a specific transmitter can be associated with each category of object detected so that the combined detector automatically provides the operator with information on the type of object detected.

Figure 5:
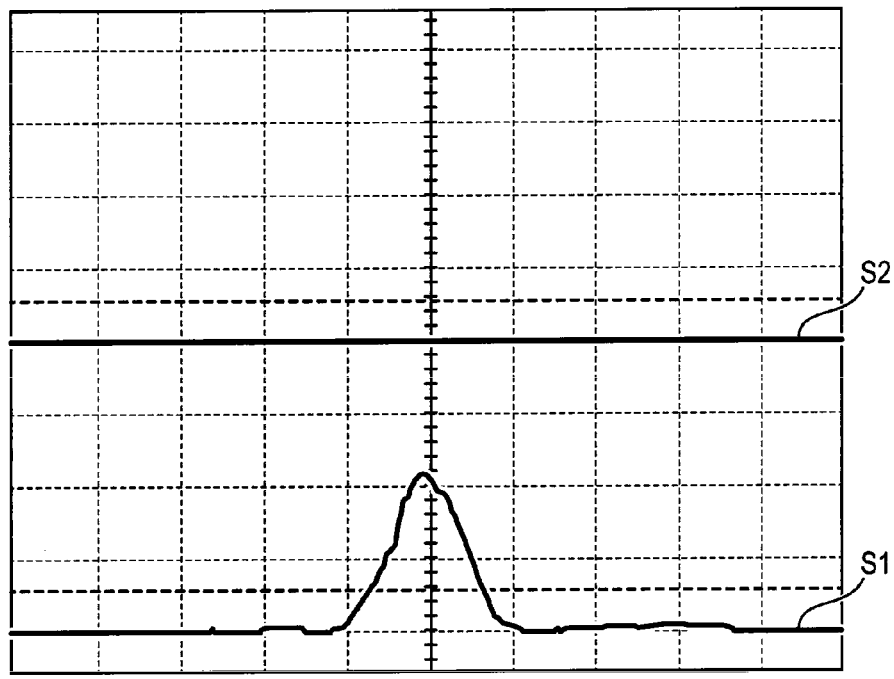
FIG. 5 represents, as a function of time, on the one hand the signal representative of the disturbance in the alternating magnetic field generated by the coils of an exemplary embodiment of an active metal detection system, and on the other hand the signal indicative of a static magnetic field detected by an exemplary embodiment of a passive detection system, upon passage of a miniaturized phone being approximately 2.5 cm×7 cm in dimension.

For example, when, in the same spatial area of the walk-through detector and in the same time interval, the magnetostatic sensor(s) generate a signal S1 indicative of a high intensity of a static magnetic field, but when the signal S2 representative of the disturbance in the alternating magnetic field is low or very low (see FIG. 5), the central processing unit 2 deduces therefrom that the detected object comprises little metal and a magnetized element. The central processing unit 2 therefore determines that the detected object falls within the category of the miniaturized phones and sends alarm generation instructions to the dedicated transmitter of this category of object.

Figure 6:
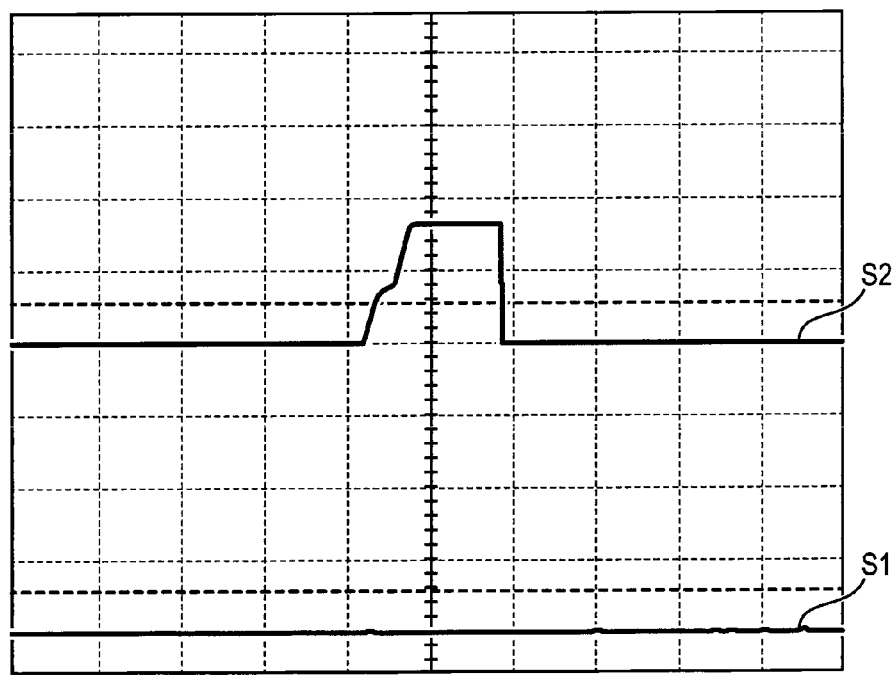
FIG. 6 represents, as a function of time, on the one hand the signal representative of the disturbance in the alternating magnetic field generated by the coils of the exemplary embodiment of an active metal detection system of FIG. 5, and of on the other hand the signal indicative of a static magnetic field detected by the exemplary embodiment of a passive detection system of FIG. 5, upon passage of an elbow element made of non-magnetic metal (aluminum here) resembling a handgun (NIJ LO-A96061).

In another example, when, in the same spatial area of the walk-through detector and in the same time interval, the magnetostatic sensor(s) generate a signal S1 indicative of a low or very low intensity of a static magnetic field, but when the signal S2 representative of the disturbance in the alternating magnetic field is high (see FIG. 6), the central processing unit 2 deduces therefrom that the detected object comprises metal and little or no magnetized element. The central processing unit 2 therefore determines that the detected object falls within the category of weapons and sends alarm generation instructions to the dedicated transmitter of this category of object.

Figure 7:
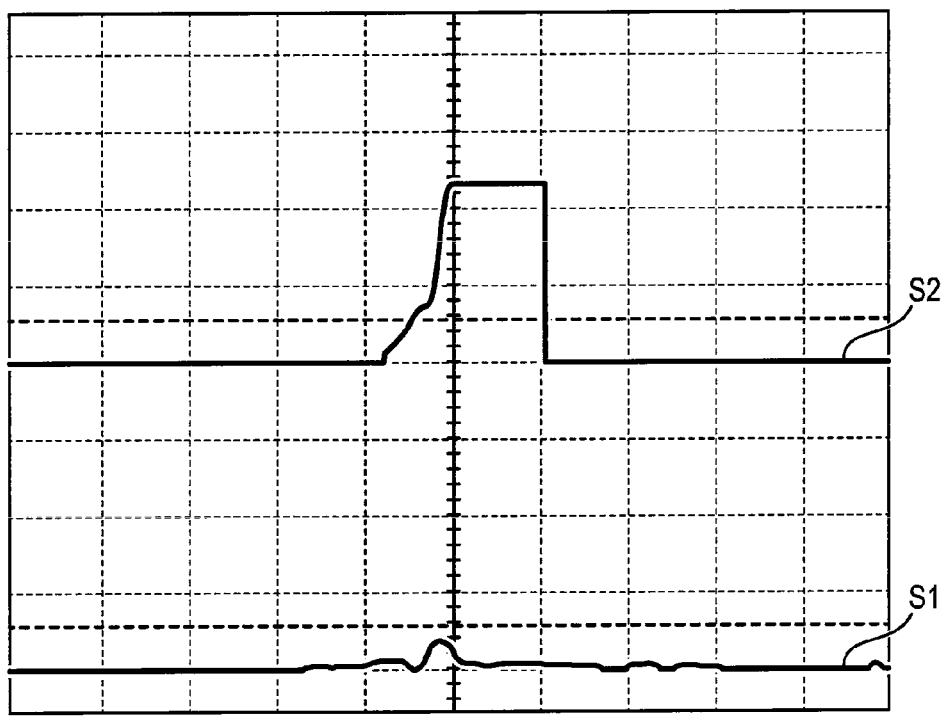
FIG. 7 represents, as a function of time, on the one hand the signal representative of the disturbance in the alternating magnetic field generated by the coils of the exemplary embodiment of an active metal detection system of FIG. 5, and on the other hand, the signal indicative of a static magnetic field detected by the exemplary embodiment of a passive detection system of FIG. 5, upon passage of a conventional phone (here a Samsung Galaxy Note 5).

In yet another example, when, in the same spatial area of the walk-through detector and in the same time interval, the magnetostatic sensor(s) generate a signal S1 indicative of a high or moderate intensity of a static magnetic field and when the signal S2 representative of the disturbance in the alternating magnetic field is also high (see FIG. 7), the central processing unit 2 deduces therefrom that the detected object comprises metal and a magnetized element. The central processing unit 2 therefore determines that the detected object falls within the category of conventional phones and sends alarm generation instructions to the dedicated transmitter of this category of object.

Optionally, the passage of the person to be inspected is further detected by the photoelectric cells 8*a* and the reflectors 8*b*, which send position information on the person to the control unit. This position information can then also be correlated in time and/or space with the signal representative of a disturbance in the alternating magnetic field and with the signal indicative of an intensity of a static magnetic field.

Particularly, the photoelectric cells 8*a* can be synchronized with the alarm generation upon detection of a target object by the walk-through detector 10 and/or the barrier(s) 20. Indeed, depending on the orientation and the size of the target object, the distance between the target object and the coils 14, 15 corresponding to the peak of the signal generated by the walk-through detector 10 can be different from the distance between this target object and the magnetostatic sensors 22 corresponding to the peak of the signal generated by the barrier(s) 20. Likewise, depending on the configuration of the combined detector, the spatial position of these coils 14, 15 and of these magnetostatic sensors 22 may also be different. Consequently, the detection of the transit of the inspected person using the photoelectric cells 8*a* and the reflectors 8*b* can be used by the central processing unit 30 in order not to compare the signals generated by these coils 14, 15 and these magnetostatic sensors 22 with the corresponding predetermined threshold value only when the inspected person leaves the transit channel, that is to say when the inspected person crosses the beam of the pair of photoelectric cell 8*a* and reflector 8*b* located most downstream of the walk-through detector 10. In this way, the processing of the signals by the central processing unit (30) is facilitated and more accurate.

The invention claimed is:

1. A combined detector comprising:
   an active metal detection system comprising two vertical supports defining therebetween a transit channel, and coils housed in the two vertical supports and configured to emit an alternating magnetic field, wherein the coils are configured to generate a first signal, wherein the first signal is representative of a disturbance in the alternating magnetic field induced upon passage of an individual between the two vertical supports;
   a passive metal detection system comprising a magnetostatic sensor configured to generate a second signal based on detection of a static magnetic field upon passage of the individual between the two vertical supports, wherein the second signal is proportional to an intensity of the static magnetic field, the passive metal detection system being housed in one of the vertical supports; and
   a central processing unit connected to the coils and to the magnetostatic sensor, wherein the central processing unit is configured to:
   receive and process the first signal and the second signal; and
   send alarm generation instructions to a transmitter when at least one of the first signal or the second signal is greater than a first predetermined threshold or a second predetermined threshold, respectively.

2. The combined detector of claim 1, further comprising a conductive shield associated with the magnetostatic sensor and configured to short-circuit surface currents.

3. The combined detector of claim 2, wherein the magnetostatic sensor is surrounded by the conductive shield.

4. The combined detector of claim 2, wherein the conductive shield comprises a cylindrical sleeve made of a non-magnetic metallic material.

5. The combined detector of claim 4, wherein non-magnetic metallic material comprises at least one of the following materials: aluminum, copper, or brass.

6. The combined according to claim 2, wherein the magnetostatic sensor has a first height and the conductive shield has a second height, the second height being greater than the first height.

7. The combined detector of claim 6, wherein the magnetostatic sensor is centered in height with respect to the conductive shield.

8. The combined according to claim 6, wherein the second height is at least equal to 1.5 times the first height.

9. The combined detector of claim 2, wherein the passive detection system further comprises:
- at least one additional magnetostatic sensor, the magnetostatic sensor and the at least one additional magnetostatic sensor being distributed over a height of the passive metal detection system, the magnetostatic sensor and the at least one additional magnetostatic sensor being each surrounded by a conductive shield, and
- at least one separation sleeve made of an electrically insulating material, the at least one separation sleeve being placed between two adjacent conductive shields.

10. The combined detector of claim 2, wherein the conductive shield is connected to a fixed potential.

11. The combined detector of claim 10, further comprising at least one additional magnetostatic sensor, wherein the magnetostatic sensor and the at least one additional magnetostatic sensor are connected to the fixed potential according to a star configuration.

12. The combined detector of claim 2, wherein the conductive shield is connected to ground.

13. The combined detector of claim 1, wherein the central processing unit is further configured to correlate in time the first signal and the second signal.

14. The combined detector of claim 1, further comprising an additional passive metal detection system comprising an additional magnetostatic sensor configured to generate an additional second signal, wherein the additional second signal is indicative of an intensity of a static magnetic field;
- wherein the passive metal detection system is housed in a first of the vertical supports and the additional passive metal detection system is housed in a second of the vertical supports, the magnetostatic sensors and the additional magnetostatic sensor being positioned at a same height relative to the floor;
- wherein the passive metal detection system and the additional passive metal detection system are each connected to the central processing unit; and
- wherein the central processing unit is further configured to calculate a value from the second signal and the additional second signal, the value comprising one of the following calculated values:
  - an average value of the second signal and the additional second signal;
  - an average, a sum, or a maximum value of the corrected values of the second signal and the additional second signal, wherein the corrected values are obtained by applying an attenuation coefficient to a value of the second signal and the additional second signal respectively;
  - a sum of the values of the second signal and the additional second signal; or
  - a maximum value among the values of the second signal and the additional second signal.

15. The combined detector of claim 1, wherein the central processing unit is further configured to correlate in space the first signal and the second signal.

16. The combined detector of claim 1, further comprising an additional passive metal detection system comprising two additional magnetostatic sensors, each configured to generate an additional second signal, wherein the additional second signals are indicative of an intensity of a static magnetic field;
- wherein the passive metal detection system comprises a supplementary magnetostatic sensor configured to generate another second signal;
- wherein the passive metal detection system is housed in a first of the vertical supports and the additional passive metal detection system is housed in a second of the vertical supports, the magnetostatic sensor, the supplementary magnetostatic sensor, and the additional magnetostatic sensors being positioned two by two at a same height relative to the floor so as to form pairs of magneto static sensors;
- wherein the passive metal detection system and the additional passive metal detection system are each connected to the central processing unit; and
- wherein the central processing unit is further configured to calculate a value from the second signals and the additional second signals, the value comprising one of the following calculated values:
  - an average value for each pair of magnetostatic sensors of the second signal and the additional second signal;
  - an average, a sum, or a maximum value of corrected values of the second signal and the additional second signal, wherein the corrected values are obtained by applying to each pair of magnetostatic sensor an attenuation coefficient to a value of the second signal and the additional second signal, respectively;
  - a sum for each pair of magnetostatic sensors of the values of the second signal and the additional second signal; or
  - a maximum value among the value of the second signals and the additional second signals.

17. A combined detector comprising:
- an active metal detection system comprising two vertical supports defining therebetween a transit channel, and coils housed in the two vertical supports and configured to emit an alternating magnetic field, wherein the coils are configured to generate a first signal, wherein the first signal is representative of a disturbance in the alternating magnetic field induced upon passage of an individual between the two vertical supports;
- a passive metal detection system comprising a magnetostatic sensor configured to generate a second signal, wherein the second signal is indicative of an intensity of a static magnetic field, the passive metal detection system being housed in one of the vertical supports; and
- and a central processing unit connected to the coils and to the magnetostatic sensor, wherein the central processing unit is configured to:
  - receive and process the first signal and the second signal; and
  - correlate the first signal and the second signal in at least one of time or space.

18. A combined detector comprising:
- an active metal detection system comprising two vertical supports defining therebetween a transit channel, and coils housed in the two vertical supports and configured to emit an alternating magnetic field, wherein the coils are configured to generate a first signal, wherein the first signal is representative of a disturbance in the alternating magnetic field induced upon passage of an individual between the two vertical supports;
- a passive metal detection system comprising a magnetostatic sensor configured to generate a second signal, wherein the second signal is indicative of an intensity of a static magnetic field, the passive metal detection system being housed in one of the vertical supports, the magnetostatic sensor having a first height; and
- a conductive shield associated with the magnetostatic sensor and configured to short-circuit surface currents, the conductive shield having a second height at least equal to 1.5 times the first height.

\* \* \* \* \*